United States Patent [19]
Blandy

[11] Patent Number: 5,809,551
[45] Date of Patent: Sep. 15, 1998

[54] PENDING PAGE RELEASE

[75] Inventor: Geoffrey Owen Blandy, Vestal, N.Y.

[73] Assignee: International Business Machines Corporation, Armonk, N.Y.

[21] Appl. No.: 303,974

[22] Filed: Sep. 9, 1994

Related U.S. Application Data

[63] Continuation of Ser. No. 749,365, Aug. 23, 1991, abandoned.

[51] Int. Cl.$^6$ ............................. G06F 12/00; G06F 12/08
[52] U.S. Cl. ............................. 711/170; 711/117
[58] Field of Search ..................... 395/460, 463, 395/481, 486, 497.02, 621, 622; 711/133, 136, 154, 159, 171, 170, 117; 707/205, 206

[56] References Cited

U.S. PATENT DOCUMENTS

| | | | |
|---|---|---|---|
| 4,660,130 | 4/1987 | Bartley et al. | 395/413 |
| 4,757,438 | 7/1988 | Thatte et al. | 395/406 |
| 4,775,932 | 10/1988 | Oxley et al. | 395/600 |
| 4,811,216 | 3/1989 | Bishop et al. | 395/480 |
| 4,989,137 | 1/1991 | Oxley et al. | 395/413 |
| 5,093,913 | 3/1992 | Bishop et al. | 395/650 |
| 5,237,673 | 8/1993 | Orbits et al. | 395/497.01 |
| 5,269,013 | 12/1993 | Abramson et al. | 395/650 |
| 5,517,643 | 5/1996 | Davy | 395/675 |

FOREIGN PATENT DOCUMENTS 2146646   6/1990   Japan.

*Primary Examiner*—Tod R. Swann
*Assistant Examiner*—Conley B. King, Jr.
*Attorney, Agent, or Firm*—Arthur J. Samodovitz

[57] ABSTRACT

A method, apparatus and article of manufacture for managing pages of virtual storage in a computer system by delaying the actual release of a page by the system after its release has been requested by a guest program of the system, resulting in pending page releases. Establishment of a pending page release results in an entry in a log of pending page release, leaving the page(s) allocated to the guest. The system can release pages in the log at any time. The guest can request cancellation of pending page releases, in which case the requested pages are removed from the log for reuse by the guest if they have not already been released by the system. Key setting, page clearing or formatting, and page validation or staging, are optional services which can be included in cancellation requests. Establishment and cancellation are preferably requested by the guest using the intercepted instruction DIAGNOSE, and are performed by a storage manager component of the host operating system. Cancellation of pending page release is requested using the DIAGNOSE instruction, although a dedicated machine instruction could be substituted. The system processes the log of pending page release requests to conventionally release the pending pages.

26 Claims, 8 Drawing Sheets

```
201    If obsolete pages needed Then
          Do
202       RX <== low_page               /* Address of 1st page
                                            into even register*/
203       RX+1<== high_page             /* Address of last page
                                            into odd register*/
204       Subfunction <== 1             /* Setup a PPR cancel */

205       If immed-ref Then             /* If the page is to be
             ORF.2 <== 1                   immediately referenced,
                                            request that it be made
                                            valid in main memory. */
206       ORF.0 = 1                     /* Request key setting */
207       ORF.1 = 1                     /* Request page
                                            clearing */
208       RY <== key value              /* Storage key value */
209       DIAGNOSE 214 RX,RY            /* Execute PPR DIAGNOSE
                                            instruction */
          End ====> Instruction Interception <====
```

PPR CANCEL - PART A

VM/ESA SYSTEM WITH PPR

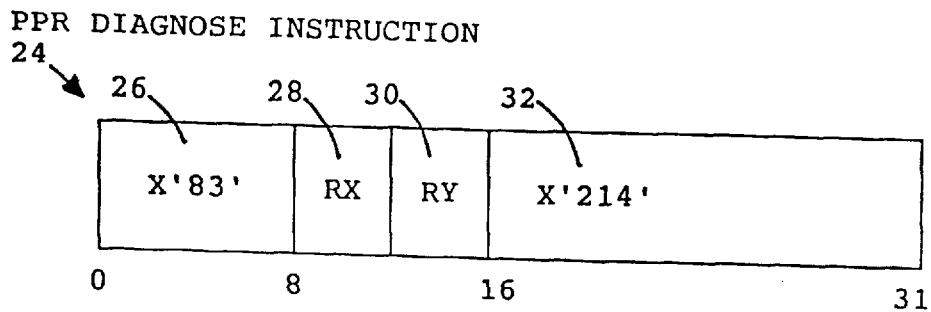
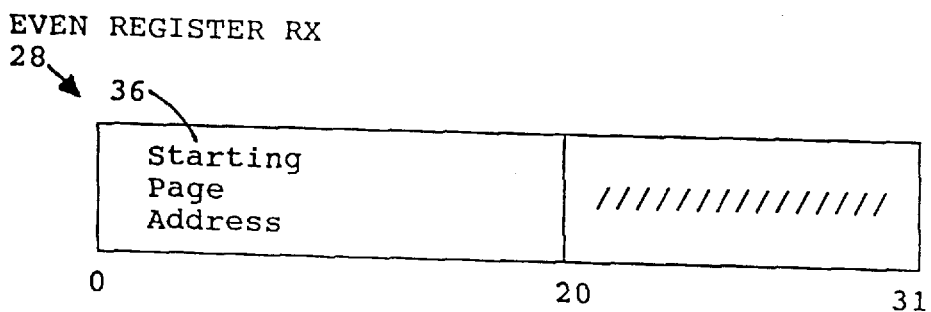
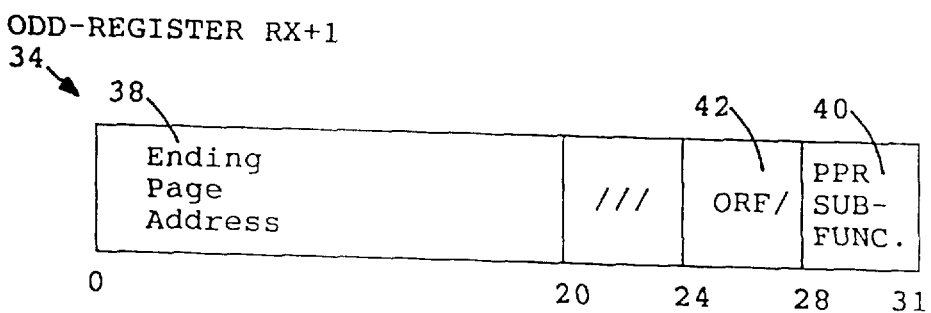
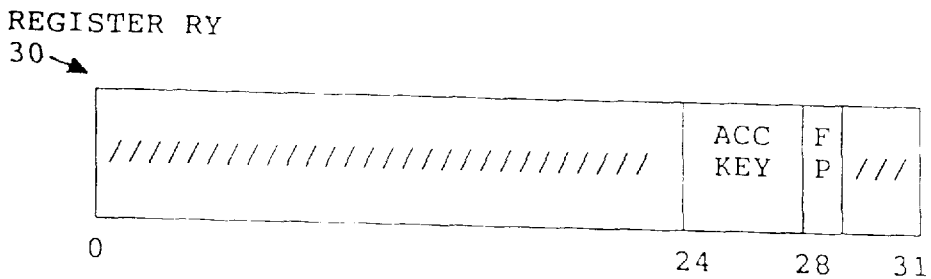
FIG. 2
PPR INSTRUCTION AND REGISTERS

```
101  If obsolete_pages then
        Do
102     RX <== low_page            /* Address of 1st page
                                      into even register*/
103     RX+1<== high_page          /* Address of last page
                                      into odd register*/
104     Subfunction <==            /* Setup PPR Establish */
        0
105     DIAGNOSE 214 RX,0          /* Execute PPR DIAGNOSE
        End                           instruction */

====> Instruction Interception <====
```

FIG. 3A
PPR ESTABLISH - PART A

```
106  If interception =                    /* Is this a PPR
        DIAGNOSE X'214' Then                  request? */
        Do
107     If subfunction = 0               /* Is this a PPR
        Then                                 Establish? */
          Do
108       If no log Then                 /* Get a log if none */
             Create log
109       If log is full Then            /* Process log to make
             Process log                     room for new entry */
110       If new range is                /* If contiguous, update
             contiguous to old               old entry */
          Then
             Update old entry
          Else
                                         /* Otherwise make new
                                            entry */
             Do
111          Locate next_log_entry       /* Find next available
                                            slot for entry */
112          Log_entry <== Even-odd      /* Create log entry */
             registers
             End
113       Do for pages from first        /* For all released
             to last                        pages */
114          If pages are valid in
             extended storage, Then
                Reclaim ES
115          If pages are valid on
             DASD Then
                Reclaim DASD
          End
116       Start Interpretive             /* Return to guest */
             Execution (SIE)
          End
117     Else Goto 210                    /* See below for PPR
        End                                  Cancel operation */
118  Else ...                            /* Not PPR Instruction */
```

FIG. 3B
PPR ESTABLISH - PART B

```
201   If obsolete pages needed Then
         Do
202      RX <== low_page              /* Address of 1st page
                                         into even register*/
203      RX+1<== high_page            /* Address of last page
                                         into odd register*/
204      Subfunction <== 1            /* Setup a PPR cancel */

205      If immed-ref Then            /* If the page is to be
            ORF.2 <== 1                  immediately referenced,
                                         request that it be made
                                         valid in main memory. */
206      ORF.0 = 1                    /* Request key setting */
207      ORF.1 = 1                    /* Request page
                                         clearing */
208      RY <== key value             /* Storage key value */
209      DIAGNOSE 214 RX,RY           /* Execute PPR DIAGNOSE
                                         instruction */
         End ====> Instruction Interception <====
```

FIG. 4A
PPR CANCEL - PART A

```
210  If interception = DIAGNOSE 214        /* Is this a PPR
     Then                                   request? */
       Do
211    If subfunction = 1 Then             /* This is a PPR Cancel*/
         Do
212      If ORF.1 = 1 Then                 /* Page clearing
           Do                                 requested? */
213        If valid in memory Then        /* Is the page in
                                            memory? */
214          Clear page                    /* Clear it to zeros */
215        End
216      If ORF.2 = 1 Then                 /* Page validation
           Do                                 requested? */
217        If not valid in memory Then    /* Page not in memory? */
218          Validate                      /* Bring it in */
219        End
220      If ORF.0 = 1  Then                /* Key setting
           Do                                 requested? */
221        If page not valid Then         /* If invalid in main
                                            storage */
222          Store RY.24-28 in PGSTE       Store RY into PGSTE */
223        Else                            /* Page is valid */
             Do
224            If RY.24-28 ≠ Access        /* Same as Access Control
               Control Then                  value? */
225              SSKE using RY             /* If not, do SSKE */
226            Else
                 NOP                       /* If so, avoid SSKE */
             End
227      If no log Then                    /* If no log,
             Start Interpretive              return to guest */
             Execution (SIE)
228      Do for entries = 1 to            /* Process all log
           current number of log            entries */
           entries all log
229        If pages in range Then         /* If cancelled pages are
                                            in current entry's range,
             Delete entry                   delete the entry */
230        If pages in part of
           range Then
             Update entry
           End
231      Start Interpretive                /* for all log entries */
         Execution (SIE)                   /* Return to guest */
         End
232    Else
         Specification exception           /* Bad PPR subfunction
                                             specified */
       Else ... (not DIAGNOSE 214)         /* Not PPR DIAGNOSE */
```

FIG. 4B
PPR CANCEL - PART B

| | | |
|---|---|---|
| 301 | If guest dropped from queue Then | /* Guest no longer active */ |
| | Do | |
| 302 | Perform Process | /* Process log */ |
| 303 | Release Log | /* Return log's storage to system */ |
| | End | |
| | If migrating storage from guest Then | /* Guest's storage being migrated */ |
| 305 | Perform Process | /* Process log */ |
| | Process: | |
| 306 | Lock space | /* Acquire address space serialization */ |
| 307 | Do for all log entries | |
| | Standard Page Release | /* Reclaim resources */ |
| | End | |
| 309 | Unlock space | /* Release address space serialization */ |
| 310 | Return | |

FIG. 5
PROCESS PPR LOG

EXAMPLE OF PPR LOG

PENDING PAGE RELEASE

This is a continuation of application Ser. No. 07/749,365, filed on Aug. 23, 1991, now abandoned.

BACKGROUND OF THE INVENTION

1. Technical Field

This invention relates to digital computer systems, and more particularly to virtual storage management performed by operating system software.

2. Description of the Prior Art

Many digital computer systems today use virtual storage, which is typically subdivided into elements called pages which are of a fixed size (e.g. 4,096 bytes). The contents of a virtual page must reside in main memory to allow access by the central processing unit (CPU).

The system storage manager (SSM) is that component of the system responsible for promoting the contents of virtual storage into main memory and for providing and clearing a frame of main memory when a new (null) page is to be referenced. In systems with a plurality of memory types, the SSM manages the migration of virtual page contents throughout the memory hierarchy, which may include additional electronic storages (e.g. expanded storage) and auxiliary storages (e.g. disk storage which is also known as DASD). This migration is necessary because the total amount of virtual storage on a system is usually far greater than the amount of main memory. In fact, it is usually the case that only the final (slowest) level of the memory hierarchy is large enough to contain all of the virtual storage.

In a computer system with virtual storage, the contents of virtual pages frequently become obsolete, such as when they represent data or logic that is required by a previous transaction but is irrelevant to subsequent transactions. If the SSM is unaware that the contents of a page are obsolete, it must preserve those contents either by retaining the page in main memory or by migrating the page to another level of the memory hierarchy. In systems with a multi-level memory hierarchy, the contents may be migrated to slower and slower levels as the page remains idle. On the other hand, if the SSM is aware that the contents are obsolete, it can release the storage without preserving its contents, thereby avoiding migration.

Many prior art systems have no way to identify obsolete pages. This ignorance leads to unnecessary churning on the part of the SSM as it proceeds to migrate the obsolete data through the various levels of the memory hierarchy. Also, the pages continue to take up resources (e.g. main memory, expanded storage) in whatever level or levels of the hierarchy they reside.

To address these problems, some prior art systems have implemented a page release function for identifying obsolete pages to the SSM. A component of the system runs in a virtual storage environment, and can identify obsolete pages to the SSM. This component is typically part of the user's program and will be called the user memory manager (UMM). The UMM identifies obsolete pages to the SSM, which then immediately reclaims the associated storage resources.

Such known prior art page release systems have the following disadvantages:

1. All the pages must be released at the time of the original notification, even though there may be more than sufficient storage available at the time of the request. The SSM cannot postpone the release until system demand increases, because the owner may begin to reuse the pages in the interim.

2. Reuse of a released page invariably results in a page fault, because the page is no longer in main memory. Page fault processing requires control program intervention and may be quite expensive in terms of CPU utilization.

3. When a main storage page is released on systems such as the IBM Enterprise Systems Architecture/370 (ESA/370) (trademarks of International Business Machines Corporation) that use a translation lookaside buffer (TLB), each TLB entry must be invalidated before returning control to the user. The SSM may purge the entire TLB or only the individual entries for the pages whose main storage has been released. Purging the entire TLB has the disadvantage of requiring full translation the first time each page is subsequently referenced. Purging individual entries requires the use of an Invalidate Page Table Entry (IPTE) instruction that broadcasts to and awaits a reply from each CPU in the configuration. On a 6-way system, this results in a very long running instruction on the CPU that issues it (up to 200 times an average instruction), as well as interference at the other CPUs. Further details of the translation lookaside buffer (TLB) may be found in the IBM Enterprise Systems Architecture/370 Principles of Operation.

4. Only those pages identified for the current request can be acted upon, thus batching of multiple page release requests is impossible. The location and serialization of an address space and any requisite housekeeping must be done for each page release.

5. When protection keys are to be used, the keys must be set using the long running Set Storage Key Extended (SSKE) to set each individual key. Like IPTE, SSKE broadcasts to and awaits a reply from each CPU in a configuration.

A null virtual page is one that is void of content, as is the case for a page that has never been referenced by its owner. When the CPU attempts to access a null page or a page whose contents are not in main memory, an exception condition exists and the system storage manager (SSM) is notified via a signal known as a page fault. A page fault on a null page results in the SSM supplying a page of zeros. In the known prior art page release systems, there is no means to identify impending references to null pages. Therefore, the SSM cannot avoid subsequent page faults by validating a group of such pages prior to the user's referencing them.

SUMMARY OF THE INVENTION

One embodiment of this invention is a method for providing pending release in a computer virtual storage management system which has multiple storage units such as pages, at least one of which is assigned to a user of the system such as an application program or guest operating system. Using this method with a page of virtual storage, the user requests pending release of the page, thereby identifying that page to the system as being obsolete and ready for release. Next, the system grants the request, placing the page in a pending release state but postponing actual release of the page. Then, before the system has released the page, the user determines to reuse the page. The system then removes the page from the pending release state for reuse by the user, instead of releasing it.

Preferably, this method is supplemented by steps which provide additional services at the time the pending page release is cancelled. These services may include key setting, page clearing/formatting, and the staging of pages into main memory.

Another embodiment of this invention is in a computer system including multiple storage units (such as pages) which can be assigned to users of the system. A first program module, preferably part of a storage manager in the host operating system, contains a first module which places a storage unit assigned to the user into the pending release state. The system includes means for actually releasing storage units which are in the pending release state. A second module removes storage units from the pending release state for reuse by the user if the releasing means has not already actually released the storage unit.

Yet another embodiment of this invention is in an article of manufacture which is preferably a prerecorded computer program product. This article includes a recording medium, such as magnetic tape, for recording a computer program which can be executed on a computer system. The computer system would have multiple storage units (such as pages) which can be assigned to and released from a user. Two program modules embodying the invention are recorded on the medium and are executable on the system. A first module places at least one of the storage units in a pending release state at the request of the user. A second module removes storage units from the pending release state for reuse by the user if the system has not already released them.

Other features and advantages of this invention will become apparent from the following detailed description of the presently preferred embodiment of the invention, taken in conjunction with the accompanying drawings.

BRIEF DESCRIPTION OF THE DRAWINGS

FIG. 2 is a register format of the pending page release instruction of the system of FIG. 1.

FIGS. 3A and 3B show a pseudocode fragment for establishing a pending page release in the system of FIG. 1.

FIGS. 4A and 4B show a pseudocode fragment for cancelling a pending page release in the system of FIG. 1.

FIG. 5 is a pseudocode fragment for processing a log of pending page releases in the system of FIG. 1.

Figure 1:
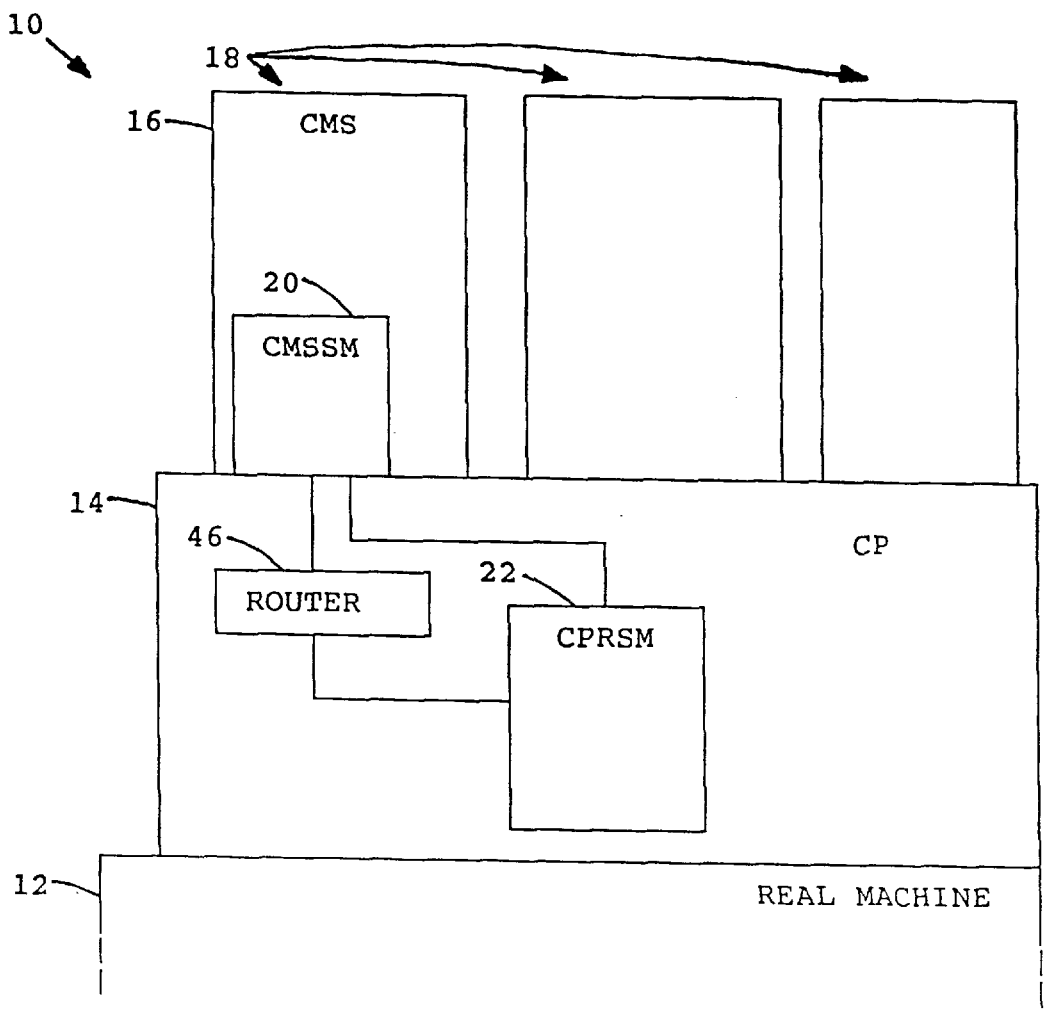
FIG. 1 is a block diagram of a VM/ESA computer system including a storage manager (CMSSM) according to a preferred embodiment of this invention.

Pseudocode fragments are provided in the drawings to illustrate the program modules by which the preferred embodiments of this invention are implemented. Pseudocode provides the most easily understood and universal method for explaining the design and operation of a program module to the reader of ordinary skill in the art. Of course, it will be understood that this pseudocode cannot be directly interpreted or compiled, but must be translated into the reader's preferred programming language.

DESCRIPTION OF THE PREFERRED EMBODIMENT

Introduction

The pending page release (PPR) operations of this invention provide a means for a user to identify obsolete pages to the system for placement into a pending release state. PPR also provides a means for the user to notify the system when the user wishes to reuse an obsolete page which is in the pending release state. If the system has not already chosen to release the page, it removes the page from the pending release state for reuse by the user without ever having released it.

PPR allows the system to release pages when and if the system's needs dictate such release, rather than forcing the system to release the pages immediately. Additionally, when the user notifies the system of its intention to reuse the page, the user may optionally request certain services regarding the page or pages about to be reused. These services include the setting of protection keys, the clearing or formatting of the page and the staging (validation) of the page into main memory.

Background of the Implementation

While applicable to other virtual storage environments, the detailed description of this invention is set in the Virtual Machine/Extended System Architecture (VM/ESA) environment. As shown in FIG. 1, a VM/ESA system 10 includes VM/ESA software and a real (i.e., physical) System 370/ESA machine 12. The VM/ESA software is further partitioned into the VM/ESA Control Program (CP) 14 and the VM/ESA Conversational Monitoring System (CMS) 16. The CP 14 manages the hardware configuration using the techniques of sharing, partitioning, simulation and dedication to create and maintain "virtual machines" that are the functional equivalent of real hardware complexes. The CMS 16 runs in a virtual machine 18 and provides a platform for interactive computing.

Users (programs) that run in a VM/ESA virtual machine 18 are called guests, while the control program (CP) 14 that runs on the real machine 12 is called the host and performs the functions of the system for this invention. To invoke guest programs, the CP uses a hardware facility called interpretive execution. This allows the guest's instructions to be executed in a special environment which respects the architecture of the virtual machine and protects the real machine from the guest. The actual instruction used to enter interpretive execution mode and invoke a guest program is Start Interpretive Execution (SIE).

The user memory manager (UMM) for CMS 16 is the CMS Storage Manager (CMSSM) 20. Programs running in a CMS virtual machine obtain the storage they require (for control blocks, work areas, program loading etc.) via requests to the CMSSM. When these programs no longer require their storage, they return it to the CMSSM.

The system storage manager (SSM) in the VM/ESA system 10 is comprised of the Real Storage Management component (CPRSM) 22 of the VM/ESA control program (CP) 14 and various machine assists and facilities, including dynamic address translation which operates on pages that consist of 4K bytes on a 4K byte boundary.

In the VM/ESA system 10, guests can request services and/or information from the CP 14 via the DIAGNOSE instruction. Its use is similar to the use of supervisor calls in other System/370 systems. Execution of the DIAGNOSE instruction by a guest results in what is known as an instruction interception. This interception causes the machine to store information identifying the intercepted instruction (in this case, the DIAGNOSE), and then to exit interpretive execution mode and return to the host control program (CP) 14.

Pending Page Release Instruction

To establish a PPR, the CMSSM 20 issues a DIAGNOSE instruction 24 with a function code X'214' that identifies the request as pertaining to PPR. FIG. 2 shows the instruction format and register contents for the PPR function of the DIAGNOSE instruction of the VM/ESA system 10.

The DIAGNOSE instruction is 32 bits long, with the first eight bits (0–7) containing the hexadecimal opcode X'83'

26, which identifies the instruction as DIAGNOSE. The next 4 bits (8–11) specify an even-odd register pair RX 28 and RX+1 34 which contain the starting and ending page addresses for the pages affected by the instruction. The four bits after that (12–15) specify a register RY 30 containing a key value for use during a PPR cancel operation (see discussion below). The last 16 bits (16–31) are a function code 32 which contains the hexadecimal value X'214' to specify that this DIAGNOSE instruction is for a pending page release.

Bits 0–19 of each of the registers RX 28 and RX+1 34, together with 12 bits of zeros appended to their right, form the 32 bit address of virtual storage pages. The even register RX 28 specifies the address 36 of the first page in the range, i.e. the starting address of the range of pages to be affected by the PPR instruction. The odd register RX+1 34 specifies the ending, or last, address 38 of the range of affected pages. The "range" may be a single page, in which case bits 0–19 of RX and RX+1 will be the same.

Bits 28 through 31 of the odd register RX+1 34 specify a subfunction code 40 of the PPR instruction. This subfunction code allows the guest to specify whether a pending page release is to be established or cancelled. Bits 24 through 27 of the odd register RX+1 make up an options request field (ORF) 42 which can be used to specify optional services to be performed when a PPR is cancelled. When a PPR is established, no optional services are provided, so the ORF 42 is ignored.

Figure 6:
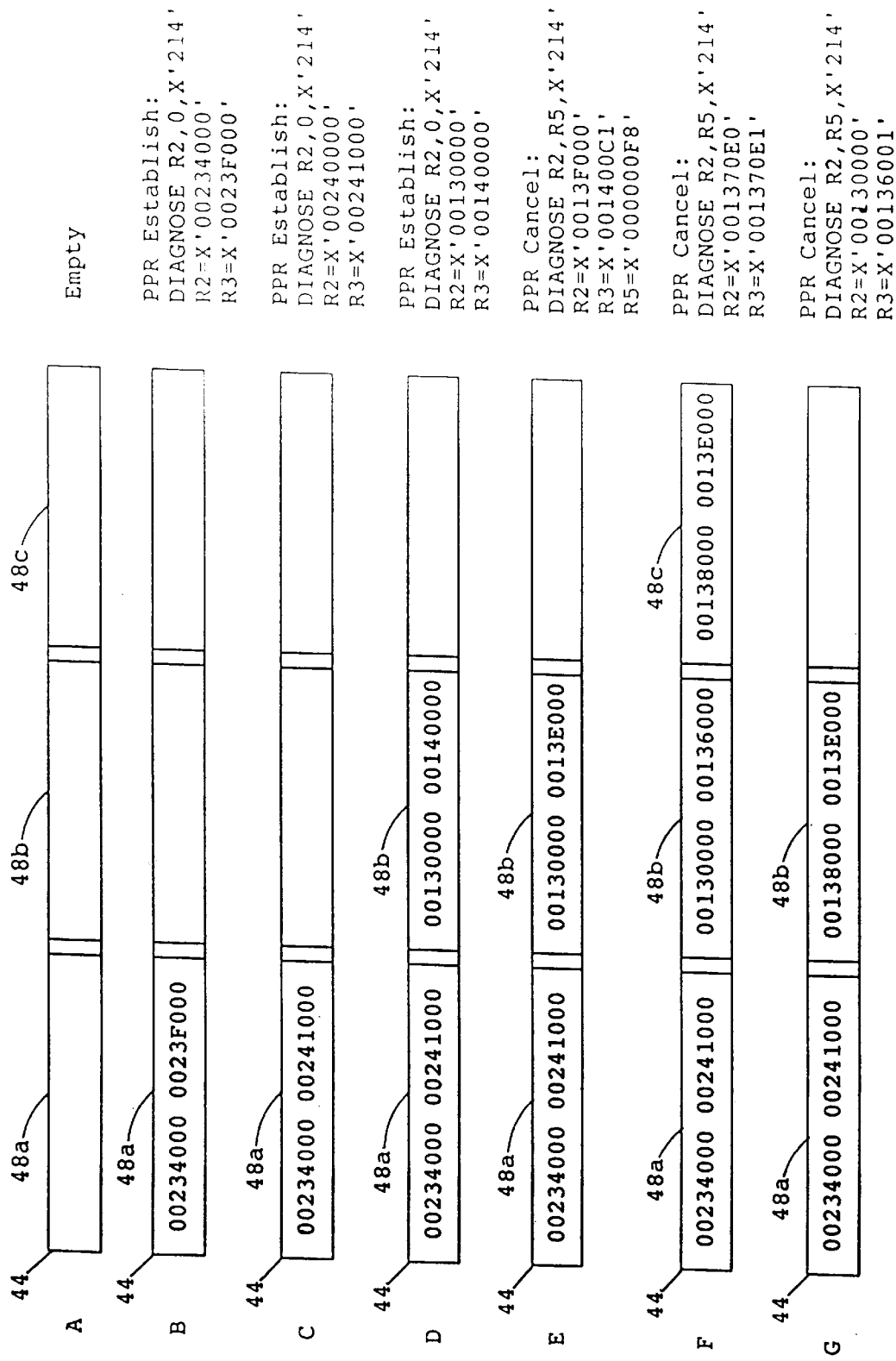
FIG. 6 is an example of changes in the log of FIG. 5 as pending page releases are established and cancelled.

A PPR log 44 is maintained by the CPRSM 22 for each guest that has one or more pages in the pending release state. If the CPRSM receives a request to establish a pending page release and the guest currently has no log, one is created. The log contains a pointer used to locate the next available entry. The same pointer locates the last valid entry in the log. An example of a PPR log is shown in FIG. 6.

Establishing a Pending Page Release

The CMSSM 20 assigns storage to application programs in parcels that may be smaller, larger or equal in size to a page, and such variously sized parcels are returned to the CMSSM. The CMSSM merges the returned storage with its other non-assigned storage. When this process results in one or more pages becoming non-allocated, the CMSSM requests a pending release for those pages and the CPRSM adds an entry to its PPR log, thereby placing the obsolete pages in the pending release state.

The CMSSM establishes a PPR by issuing to the CPRSM 22 a PPR DIAGNOSE instruction 24 for the obsolete page(s) with the PPR sub-function code 40 set to zero, and with registers RX 28 and RX+1 34 specifying the range of pages to be released.

When the CPRSM 22 receives the DIAGNOSE instruction 24 requesting the establishment of a pending release, it merely makes an entry in the log 44 by storing the starting and ending page addresses (contained in registers RX 28 and RX+1 34) in the next available log entry. If there is no room in the log, CPRSM processes the log as described below and then makes the new entry. If the current request identifies a range of pages that are contiguous to a range that already exists in the log, the previous entry is modified to include the new contiguous pages by changing the starting or ending page number.

In addition to making the log entry, the CPRSM 22 reclaims any expanded storage and Direct Access Storage Device DASD used to hold the contents of the released pages. In the VM/ESA system 10 these resources would never be reused for the released pages, and it therefore makes sense to reclaim them at the time the release is established. In other systems where such resources can be reused, it may be more efficient to postpone their reclamation.

FIGS. 3A and 3B contain a pseudocode fragment for establishing a pending page release. Lines 101 to 105 describe actions taken by the CMSSM 20 before execution of the PPR instruction, while lines 106 to 115 describe the actions of the CPRSM 22 after execution and interception of the PPR instruction.

Initially (101), the CMSSM 20 coalesces returned parcels and forms complete pages of unallocated storage. Next (102–103), the CMSSM sets up the even-odd register pair RX 28 and RX+1 34 to be used in the DIAGNOSE instruction 24 to identify the page range. Then (104), the subfunction code 40 is set to zero to identify the request as a PPR establish operation. Finally (105), the CMSSM executes the PPR DIAGNOSE instruction 24 to perform the requested PPR operation using the register pair 28,34. The execution of the PPR DIAGNOSE instruction 24 results in leaving interpretive execution mode via instruction interception and passing control to the CP 14.

Following the instruction interception, the CP router 46 determines if the cause of the interception is a DIAGNOSE 214 PPR instruction (line 106), and if so the PPR sub-function code 40 is examined. If the PPR sub-function code is zero (107), indicating that the instruction is a PPR establish request, CPRSM 22 proceeds to see if the CMSSM 20 has an available PPR log 44, and creates one if required (108). If the CMSSM's PPR log is full (109), it is processed as discussed below with reference to FIG. 5.

If the identified pages are contiguous to an existing entry they are appended to that entry (110). Otherwise, the next available slot 48a,4Bb,48c, . . . in the log is located (111) and a log entry is created (112) by storing the contents of the even-odd register pair RX 28 and RX+1 34 in the located slot. DASD slots and expanded storage blocks are reclaimed for each page in the range (113–115). Memory resident pages continue to be valid in storage where they can be referenced by the CPU. Finally, the CMSSM 20 is reinvoked by executing the Start Interpretive Execution (SIE) instruction (116).

In summary, then, when the CMSSM 20 becomes aware of obsolete pages, it signals the CPRSM 22 via the PPR DIAGNOSE instruction 24. A parameter of the DIAGNOSE instruction identifies an even-odd register pair 28,34 that contains the starting address of a page range, the ending address of a page range and a subfunction code that indicates each page in the range should be placed in the pending release state. The DIAGNOSE causes an instruction interception and allows the CPRSM 14 to process the PPR request. During PPR establish, full PPR logs 44 are processed and missing logs are created as needed. The next available slot 48a,48b,48c, . . . in the log is filled with the contents of the even-odd registers, creating a PPR log entry. DASD and expanded storage resources are reclaimed, and the CMSSM is reinvoked. The PPR establish operation thus places a page or pages from the guest into a "pending release" state without forcing the system to actually release the page(s).

Cancelling a Pending Page Release, Including Optional Services

A necessary part of this pending page release invention is the notification by the guest of its intention to reuse a page.

When the release is cancelled the guest may request optional services such as key setting, page clearing, and page validation. Storage keys are used to access specific pages of storage. Each storage key contains an access control field which is compared to the current access key in the program status word (PSW) to determine if access is permitted to that key's respective page.

In the VM/ESA system of the preferred embodiment, before the CMSSM 20 can reuse a page for which a pending page release has been established, it must cancel the pending release by performing a PPR cancel operation. Additional services to be performed on the specified range of pages are specified using the options request field (ORF) 42.

To specify a PPR cancel operation, the subfunction code 40 is set to one and the appropriate bits in the ORF 42 are set to specify the requested optional services. Just as described above, the range of pages involved in the PPR operation is specified by bits 0–19 of the even-odd register pair RX 28 and RX+1 34.

When a pending page release is cancelled, the guest may request optional services such as key setting, page clearing, and page validation. As the guest, the CMSSM always requests the key setting and page clearing services, and may or may not request the page validation service depending on the needs of the CMSSM and its application program. The requested optional services are specified by values placed in the odd register RX+1 34 and the RY register 30 specified by the PPR DIAGNOSE instruction 24.

In the key setting service, when bit 0 of the ORF 24 (i.e., bit 24 of odd register RX+1 34) is one, the value in register RY 30 must contain the value of the storage key to be set for the designated pages. The CMSSM 20 always requests storage key setting for each cancelled PPR.

The SSKE instruction used to set keys on System 370/ESA machines is a very long running instruction, particularly in a multiprocessing system where serialization of all processors is required. In fact, execution of a single SSKE can take more than 100 times as long as the average instruction, as well as causing additional delays at the CPUs that are not executing the instruction. Therefore, reducing the number of SSKE instructions executed improves the system's performance.

When the CPRSM 22 gets a request to set a key and the page is not currently valid in main storage, it merely saves the key in a page-status-table-entry (PGSTE). Then, if the page is subsequently referenced the stored PGSTE value is used to set the page's key. Contiguous virtual pages have contiguous PGSTEs, provided they are within the same megabyte. Without PPR, the CMSSM 20 must issue an SSKE for each page in the range and the CPRSM 22 must locate each PGSTE. Using PPR to set keys, once the first PGSTE for a range of pages is located the remaining PGSTEs are addressed via simple indexing.

If instead the target page(s) 36,38 of the PPR cancel operation is currently valid in main storage, then the CPRSM 22 interrogates the copy of the access control field in the PGSTE, and if it is the same as that requested, it avoids an SSKE. The CPRSM may have to issue a Insert Storage Key Extended (ISKE) instruction to examine the content of the storage key, if it is possible for the physical storage key to be different from the PGSTE key. Even so, the ISKE instruction requires no broadcasting and is much faster than SSKE.

The change and reference bits do not have to be reset at the time the access control field of the key is set. This is because the cancellation of a pending page release will almost always be followed by a store into the reused page. Therefore, these bits will always end up being set to ones as soon as the page is referenced by the guest.

The optional page clearing service provided by PPR sets to null all designated pages that are not currently valid in main memory, and clears all valid pages to zero. Requests for this service are specified by setting bit 1 of the ORF 42 (bit 25 of odd register RX+1 34) to one. CMSSM 20 always requests the page clearing service when cancelling pending page releases.

Use of the page clearing option of PPR avoids having a page cleared by both the CMSMM 20 and the CPRSM 22. This double clearing can happen, because the CMSSM cannot know if a page in the pending release state has been processed (in which case it will be null) or not (in which case it will retain its former contents). If the CMSSM required cleared pages and PPR did not provide the clearing option, the CMSSM would need to clear all pages (including the null pages that were already cleared by the CPRSM).

The page validation option of PPR requires the CPRSM 22 to stage the requested pages into main memory so as to avoid page faults. This is useful when the CMSSM 20 intends to reference the pages immediately and needs them to be made valid in main storage if they are not already. To request the page validation service, the CMSSM 20 sets bit 2 of the ORF 42 (bit 26 of odd register RX+1 34) to one.

FIGS. 4A and 4B contains a pseudocode fragment for the program module that cancels a pending page release and handles requests for all the optional services. Lines 201 to 208 describe actions taken by the CMSSM 20 before execution of the PPR instruction, while lines 209 to 230 describe the actions of the CPRSM after execution and interception of the PPR instruction.

First, the CMSSM 20 determines that it will reuse a page currently in the pending release state (201). It then prepares to issue a PPR DIAGNOSE instruction 24 specifying the lowest page in the range in even register RX 28 (202), the highest in odd register RX+1 34 (203), and a sub-function code 40 of one (204). If the page is to be referenced immediately, bit 2 of the ORF is set to one (205) to request the optional page validation service. In any case, bits 0 and 1 of the ORF are set to ones to request the optional key setting and page clearing services (206–207). The access control key and fetch protection bit required by the key setting service are placed in bits 24–28 of register RY 30 (208) and the CMSSM 20 issues the DIAGNOSE instruction (209). This results in an instruction interception, causing control to be passed to the CP 14.

Following the instruction interception, the CP 14 determines if the cause is a DIAGNOSE 214 PPR instruction (210). If so (211), the PPR sub-function code 40 is examined. If it is a one, indicating a PPR cancel operation, the CPRSM 22 proceeds to perform any requested optional services (212–226). If the PPR operation is not a cancel (it has already been determined at pseudocode line 107 that it was not an establish), an invalid PPR sub-function code has been specified and a specification exception is reflected to the CMSSM guest (232).

If page clearing is requested (212) and the page is valid (213), it is cleared to zero (214). If it is invalid, it must be null and need not be set to zero, since a page of zeros will be provided when the page is next referenced.

If page validation is requested (216) and the page is not currently valid in main memory (217), then the page is made valid and a main storage page of zeros is supplied (218), thereby staging the page into main memory.

If key setting is requested (220) and the page is not valid in main storage, the key value from register RY 30 is stored in the PGSTE (222). If the page is valid, then the access control and fetch protection bits are compared (221) with either a saved copy (VM/ESA maintains a copy of the guest keys in a control block associated with the page) or by issuing an Insert Storage Key (this instruction is far faster than the SSKE instruction) to acquire the current contents of the key. An SSKE will be executed only if the access control field (and fetch protect) are not already set properly (225). Because CMS 16 uses the same access control value for all application data (and one other for CMS data), it is most often the case that the SSKE can be avoided.

If PPR cancel has been requested but there is currently no PPR log 44, then there is nothing to cancel (the log has been processed or the guest is trying to cancel without having established a release) and SIE is executed to return control to the CMSSM guest (227). Otherwise, each log entry is examined (228) and if all pages within a log entry are within the cancel range, the entry is deleted (229). If a subset of the pages in the entry match the cancel range, the entry is updated to remove the cancelled entry (230). Finally, CMSSM is reinvoked by re-entering interpretive execution mode (231).

To summarize, when the CMSSM 20 receives a request for storage and determines that the request should be satisfied by using a page or pages that are currently in the pending release state, it must first cancel the pending release (s). At the same time, it may request additional services for the specified pages, including key setting, page clearing, and page validation. The CPRSM 22 responds to this request by updating the PPR log 44 so that it no longer contains any of the specified pages, by performing the requested optional services, and finally by reinvoking the CMSSM.

Processing the Pending Release Log

Pages which are pending release are either returned to the guest for reuse as described above, or they are released by the system. Release of pages in the pending release state is done by processing the guest's PPR log 44.

In the VM/ESA system 10, a guest's PPR log 44 is processed by the CPRSM 22. This is done when the guest becomes inactive (dormant) or when some of the guest's pages are to be migrated to another level of storage. An inactive guest's PPR log is processed based on the assumption that its pages will not be referenced for some time and that the release of resources may avoid the need to steal pages from an active guest. A guest's log is also processed before attempted page steals and expanded storage migration, both of which are forms of page migration in the VM/ESA system 10.

To process the PPR log 44, the remaining entries are treated as in standard page release. The processing of the log involves the serialization of the guest's address space, page release for each page identified by the log, and release of address space serialization. Optionally, the actual storage containing the PPR log 44 may be returned to system storage. In the VM/ESA system, the CPRSM releases the log when the guest is dropped from the active queue.

The actual process of page release is not different from that practiced in prior art systems and should be within the scope of one of ordinary skill in the art. Therefore, it will not be discussed in detail here.

In the VM/ESA system 10, the PPR log 44 is processed when the guest's pages are being stolen or when the guest is going idle. In neither case is the guest likely to be dispatched immediately. Therefore, a purge of the translation lookaside buffer (TLB) may be avoided provided that at least one purge is performed prior to this user's eventual dispatch. In the VM/ESA system 10, which has purge TLB scheduling, PPR reduces the rate of TLB purging from several thousand per second to about a dozen per second.

A substantial amount of time spent in processing prior art page release was the overhead in getting to the page release processor, establishing addressability to the appropriate address space and other housekeeping tasks. In the prior art, this overhead was incurred for each page release. With PPR, the overhead can be spread over several releases. An even greater advantage occurs when the postponement leads to avoiding the release altogether. This will occur when pending releases are cancelled prior to the processing of the log.

FIG. 5 shows a pseudocode fragment for a program module for processing the PPR log 44. When a guest is dropped from the active queue (301), its PPR log 44 is processed (302) so as to reclaim its obsolete pages. Because the guest may be idle for some time, the storage used for the PPR log is also returned (303), so as to reclaim the storage used to store the PPR log itself. When a guest is selected for migration (305) but will remain active, its PPR log 44 is processed. However, the log is not returned to system storage so that the guest can continue to make log entries.

Before processing the log 44, address space serialization is acquired (306) to insure that in a multiprocessing environment, no other real machine CPU can translate within this space or perform any other activity that could conflict with page release. For each page in the log (307), all resources are reclaimed and returned to the system and the page is then made null. Finally, the address space serialization is released (309).

In summary, then, there are two times when the PPR log 44 is processed: when a guest is going inactive, and when guest pages are about to be migrated. Processing the log merely involves reclaiming all resources and making the page null.

Example of Operation

FIG. 6 shows an example of the changes to the PPR log 44 as the CMSSM 20 establishes and cancels pending page releases by issuing PPR instructions to the CPRSM 22.

At time A, the PPR log 44 has no active entries, indicating that the associated address space has no pages in the pending release state.

At time B, the CMSSM 20 requests a PPR establish operation by issuing a PPR DIAGNOSE instruction 24, specifying register pair R2,R3. The sub-function code 40 in register R3 is set to zero to specify a PPR establish operation, and the first 20 bits of registers R2 and R3 identify the pages between address X'234000' and X'23F000'. Following the processing of the DIAGNOSE instruction as described above with reference to FIGS. 3A and 3B, the first entry 48a in the PPR log 44 identifies those pages as being in the pending release state.

At time C, the CMSSM 20 again requests a PPR establish operation using registers R2 and R3, this time identifying pages from X'240000' through X'241000'. Because these pages are contiguous to those specified by the existing log entry 48a from time B, that entry 48a is modified to reflect the merged range of pages.

At time D, a PPR is established for pages X'130000' through X'140000'. These pages are not contiguous to any existing entry and so a new entry 48b is created.

At time E, the CMSSM 20 wishes to reuse two previously released pages, X'13F000' and X'140000'. The storage keys associated with these pages are set with an access control field of X'F' and a fetch protection bit of one. This is done by setting the PPR sub-function code 40 to one to request cancellation of a PPR, and setting the first two bits of the ORF 42 to ones (the X'C' in bits 24–27 of R3) to request key setting and page clearing. The desired access control field of X'F' is specified by bits 24–27 of register R5, and the fetch protection bit 28 of register R5 is set to one. The PPR log 44 at time E reflects the deletion of these pages from the list of pages in the pending release state.

Next, at time F, the CMSSM wishes to reuse page X'137000'. This page will be referenced immediately and will have the storage key's access control field set to X'E' and the fetch protection bit set to zero (no fetch protection). The page will also be cleared to zero. The PPR log 44 at this time shows that the former entry 48b at time E that specified pages X'130000' to X'13E000' has been split into two entries 48b,48c at time F to reflect that page X'137000' is no longer in the pending release state. Note that register R2 is used both to identify the starting page (as register RX 28) and to hold the key value (as register RY 30). In fact, in this case the PPR instruction could have been specified as DIAGNOSE 214 R2,R3 and had the same result, because the ORF 42 happens to match the desired value in the access control field.

Finally, at time G, the CMSSM wishes to reuse pages X'130000' through X'136000'. No optional services are requested. The final PPR log 44 indicates that an entry has been removed and the log has been compressed.

Advantages of the Invention

The pending page release (PPR) of this invention has several distinct advantages over prior art systems which do not permit page releasing at all. In particular, prior to selecting an address space for migration the system storage manager (SSM) processes its PPR log. In this way, the resources of the pages in the pending release state are reclaimed without requiring any migration. If the system demand for storage resources is not satisfied by this reclamation, the SSM proceeds to migrate any of the remaining pages that meet its migration criteria. The PPR log also may be processed when a guest becomes idle or enters a state in which the guest is unlikely to reuse its obsolete pages for some time. This frees up idle resources to be used by active guests or the CP.

This invention also has a number of important advantages over the known prior art page release systems discussed under the heading, "Description of the Prior Art." These advantages are as follows.

1. When a pending page release is established, it is merely logged. The system may then process the log as it deems appropriate, perhaps in response to system demand or when the owner becomes inactive. In some systems with sufficient storage resources, it may be possible that no action other than logging is required.

2. Page faults are avoided when the obsolete page resides in main storage and the reuse quickly follows the request for pending page release, or when the system demand for main storage is low.

3. TLB entries need to be considered only when the log is processed and main storage pages are actually released. Because no main storage pages are actually released when a pending page release is established, the guest may be reinvoked with all its TLB entries intact.

4. When a PPR log is processed, it typically summarizes multiple pending page release requests. This means that the fixed costs (which may include address space location and serialization) are spread out over more requests. Also, between the establishment of pending page releases and the processing of the PPR log, many pending releases may be cancelled and require no additional processing.

5. PPR provides an extremely efficient means to insure that the storage key of reused pages is the value required by the user memory manager (UMM). PPR takes advantage of certain attributes of a page in the pending release state to avoid executing SSKE instructions when the access control field of the storage key is not to be changed. This can be quite beneficial on systems that use relatively few access control settings.

6. PPR provides the option of requesting that pages be staged into and made valid in main memory when their pending release is cancelled. This can avoid subsequent page faults for pages that the UMM knows will soon be referenced. The reason this is optional (rather than always validating cancelled pages), is that the UMM may wish to cancel pending releases for a large range of pages that may be used slowly over time. To validate the pages that would not be used for quite some time could require invalidating more valuable pages.

Alternative Embodiments

In a first alternative embodiment, the PPR log could be replaced by a bit map that is addressable by the guest and the system. Each page that is eligible for pending release would be represented by two bits in the map. One of the bits would indicate that the associated page is in the pending release state, and would be set on by the guest to establish the pending release and set off by the guest to cancel the release. The other bit would indicate to the system that a pending release has been established for the page, but has not yet been processed, even though it may have been cancelled. This other bit would be set on by the guest when establishing a PPR and set off when the system processed the release.

When the system processed the bit map, if both bits were on, indicating that the page was currently in the pending release state, then all resources would be reclaimed and the page made null. If only one bit was on (the release had been cancelled by the guest but not yet processed by the system), then the main memory would be left intact, but all other copies (e.g. DASD, expanded storage) representing versions that had been released would therefore be reclaimed. This assumes that the system would never migrate the contents of a page in the pending release state.

The advantage of this alternative is that the guest could update the log without requiring any control program intervention. This would be particularly valuable when the guest is running under interpretive execution mode, because it takes significant time to exit and enter that mode.

There might be several disadvantages to this technique. First, the recovery of non-memory resources would be delayed. Second, the map would take up more space than a log. Third, if the system has only long running (expensive) instructions for processing a bit map, excessive CPU time would be spent processing the bit map. Finally, the optional services would not be available at cancellation.

A second alternative embodiment would merely examine the log to determine if a page selected for migration is in the pending release state, instead of completely processing a user's log before migrating pages. With this alternative, migration would be avoided and the backing resources would be immediately reclaimed. A bit map, with its direct indexing, would be most efficient if such a scheme were used. Because VM/ESA migrates all available pages from one address space before moving on to the next, the complete processing of the log before migration is more efficient than log examination. The examination technique would be more efficient for systems that approached migration differently, such as those that sweep through main storage and do not batch by address space.

In a third alternative embodiment, the real machine could perform the PPR operations described above as being performed by the host. Like the second alternative embodiment, this would avoid control program intervention. The disadvantage might be the amount of micro-code and hardware required and the inflexibility of implementation.

In a fourth alternative, instead of processing the entire PPR instruction, the real machine could merely log in the next available log entry by storing RX and RX+1. Interruption (or instruction interception) could result when the log is full or nonexistent. Periodically, the host could process the log, reclaiming non-main-memory storage immediately and creating an alternate log of main memory pages in the pending release state to be processed prior to migration or when a guest goes idle. This, too, would avoid control program intervention and would require substantially less microcode and/or hardware than a full implementation. The disadvantage would be delay in reclaiming non-memory resources and the absence of the optional services.

In a fifth alternative, the machine could log in the next available log entry for the PPR establish operation only. Interruption (or instruction interception) could result when the log is full or nonexistent. When the guest exited interpretive execution mode (due to an unrelated interception or interruption) the system could process the log, reclaiming non-main-memory storage. The PPR cancel operation would continue to cause instruction interception. This alternative would allow for the use of the optional services, while reducing the number of supervisor calls.

In a sixth alternative, the detection of the guest's reuse of a page could be through inspection of the page's change bit, which would have been set to zero at the time of the PPR establish. If the guest had reused the page, the change bit would be set to one and the system would not actually release the page. This alternative would avoid the need for the guest to request a PPR cancel operation, but would not permit any of the optional services. A disadvantage of this alternative in the VM/ESA system would be that setting of the change bit requires an SSKE instruction, and is therefore quite expensive.

It will be understood that while the user has been described as a guest program running in a virtual machine maintained by the host control program, the roles of requester and releaser could be performed by other parts or programs in the system, and could even be performed by the different elements of the same program. Thus any program, including an application and an operating system, can perform the role of requester, although perhaps not as well as a user memory manager such as the CMSSM discussed above. Also, this invention is applicable to all forms and units of storage which are subject to being released by and then returned to a user, and not just to pages of virtual storage, even though the invention may be most immediately applicable in virtual storage management.

Finally, while the preferred embodiment has been described in terms of a method for establishing and cancelling pending page release requests and for processing a pending page release log, it is contemplated that it will also be embodied in a computer system (apparatus) suitably programmed to operate as described above. Such an embodiment of our preferred embodiment would include an IBM System 370/ESA computer such as an IBM 3090-series computer loaded with the IBM VM/ESA operating system as described above.

Also, it is contemplated that this invention will be embodied in a prerecorded computer program for programming a computer to establish, cancel and process pending page release requests as described above. Such an embodiment of our preferred embodiment would include a conventional data recording medium, such as a magnetic tape, and a series of instructions recorded on the tape which, when executed in a suitable computer system, would cause the system to establish, cancel and process pending page release requests as described above.

Accordingly, the scope of protection of this invention is limited only by the following claims and their equivalents.

I claim:

1. A method of managing storage allocated to a first program in a computer system, said method comprising the steps of:

the first program identifying to the system a block of said storage to be released from said allocation upon request by another program or subsequently re-used by said first program upon request by said first program if not previously released, and in response, the system storing information that said block is to be released upon request by said other program or subsequently re-used by said first program upon request by said first program if not previously released; and if said other program requests release of said block after the storing step but before re-use by said first program, the system releasing said block from said allocation, and if said first program requests re-use of said block after the storing step but before release, the system deleting said information for said block and said first program accessing said block, and wherein said other program requests release of said block if said first program goes inactive.

2. A method as set forth in claim 1 wherein said other program monitors an amount of system demand for available storage and requests release of said block when warranted by said amount of system demand.

3. A method as set forth in claim 1 wherein the first program is executed in a guest virtual machine.

4. A method as set forth in claim 1 wherein said other program requests release of said block in response to a need to migrate storage blocks to another storage level.

5. A method as set forth in claim 1 wherein said first program is an application program and further comprising the step of said application program returning subblocks to said system and said system determining when said subblocks form said block.

6. A method as set forth in claim 1 wherein said first program resides in a first virtual machine, and said system comprises a second, operating system program dedicated to said first virtual machine and a third, lower level operating system program for said first and other virtual machines, and said first program returns subblocks to said second program and said second program determines when said subblocks form said block.

7. A method as set forth in claim 1 wherein said storing step comprises the step of storing an identification of said block in a log of storage blocks to be released upon request by said other program or subsequently re-used by said first program upon request by said first program if not previously released.

8. A method as set forth in claim 7 wherein the releasing step comprises the steps of serializing address space of said first program and releasing each page identified in said log.

9. A method as set forth in claim 1 wherein the storing step comprises the step of setting a bit in a bit map for said block, said bits in said bit map indicating which blocks of said storage are to be released upon request by another program if not previously re-used by programs to which said blocks are currently allocated.

10. A method as set forth in claim 9 wherein said first program sets the bit for said block when identifying said block.

11. A method as set forth in claim 1 wherein a copy of data in said block is also stored in a lower memory level before said block is released and further comprising the step of erasing said copy after said storage block is released.

12. A method as set forth in claim 1 further comprising the steps of:

the first program identifying to the system a second block of said storage to be released from said allocation upon request by another program or subsequently re-used by said first program upon request by said first program if not previously released, and in response, the system storing information that said second block is to be released upon request by said other program or subsequently re-used by said first program upon request by said first program if not previously released; and if said other program requests release of said second block after the storing step but before re-use by said first program, the system releasing said second block from said allocation, and if said first program requests re-use of said second block after the storing step but before release, the system deleting said information for said second block and said first program accessing said second block.

13. A method as set forth in claim 1 further comprising the steps of:

the first program requesting that the system set an access control key for the block; and the system setting the key for the block prior to reuse of the block by the first program.

14. A computer system for managing storage allocated to a first program, said system comprising:

means for receiving from the first program and storing an identification of a block of said storage to be released from said allocation upon request by another program or subsequently re-used by said first program upon request by said first program if not previously released;

means, responsive to request by said other program for release of said block after the storing of said identification but before re-use by said first program, for releasing said block from said allocation; and means, responsive to request by said first program for re-use of said block after the storing of said identification but before release, for deleting said identification for said block and permitting said first program to access said block; and wherein said other program requests release of said block if said first program goes inactive.

15. A system as set forth in claim 14 further comprising means, including said other program, for monitoring system demand for available storage and requesting release of said block when warranted by said system demand.

16. A system as set forth in claim 14 wherein said storing means stores an identification of said block in a log of storage blocks to be released upon request by said other program or subsequently re-used by said first program upon request by said first program if not previously released.

17. A system as set forth in claim 14 wherein the releasing means serializes address space of said first program and releases each page identified in said log.

18. A system as set forth in claim 14 wherein the storing means sets a bit in a bit map for said block, said bits in said bit map indicating which blocks of said storage are to be released upon request by another program if not previously re-used by programs to which said blocks are currently allocated.

19. A computer program product for managing storage allocated to a first process in a computer system, said program product comprising:

a computer readable medium;

first program instruction means for instructing a processor to respond to an identification by the first process of a block of said storage to be released from said allocation upon request by another process or subsequently re-used by said first process upon request by said first process if not previously released, by storing information that said block is to be released upon request by said other process or subsequently re-used by said first process upon request by said first process if not previously released; and if said other process requests release of said block after the storing step but before re-use by said first process, releasing said block from said allocation, and if said first process requests re-use of said block after the storing step but before release, deleting said information for said block and permitting said first process to access said block; and wherein said first program instruction means is recorded on said medium.

20. A computer program product as set forth in claim 19 further comprising second program instruction means, including said other process, for instructing a processor to monitor system demand for available storage and request release of said block when warranted by said system demand; and wherein said second program instruction means is recorded on said medium.

21. A computer program product as set forth in claim 19 wherein said other process requests release of said block after the storing step, before re-use by said first process, when said first process is operational but inactive, and said first program instruction means responds by instructing said processor to release said block from said allocation.

22. A computer program product as set forth in claim 19 wherein said storage resides in a level and said other process requests release of said block after the storing step, before re-use by said first process, when another block of said storage is migrated to another level.

23. A method for managing storage allocated to a program, said method comprising the steps of:

receiving from the program and storing an identification of a block of said storage to be released from said allocation or subsequently re-used by said program upon request by said program if not previously released; and if said program becomes inactive but still operational after the storing of said identification but before re-use by said program, then releasing said block from said allocation, if said program requests re-use of said block after the storing of said identification but before release, then deleting said identification for said block and permitting said program to access said block.

24. A computer system for managing storage allocated to a program, said system comprising:

means for receiving from the program and storing an identification of a block of said storage to be released from said allocation or subsequently re-used by said program upon request by said program if not previously released;

means, responsive to said program becoming inactive but still operational after the storing of said identification but before re-use by said program, for releasing said block from said allocation; and means, responsive to request by said program for re-use of said block after the storing of said identification but before release, for deleting said identification for said block and permitting said program to access said block.

25. A method for managing storage allocated to a first program, said storage residing in a level, said method comprising the steps of:

receiving from the first program and storing an identification of a block of said storage to be released from said allocation or subsequently re-used by said first program upon request by said first program if not previously released; and if a second program decides to migrate another block of said storage to another level, after the storing of said identification but before re-use by said first program, then releasing the first said block from said allocation, if said first program requests re-use of said first block after the storing of said identification but before release, then deleting said identification for said first block and permitting said first program to access said first block.

26. A computer system for managing storage allocated to a first program, said storage residing in a level, said system comprising:

means for receiving from the first program and storing an identification of a block of said storage to be released from said allocation or subsequently re-used by said first program upon request by said first program if not previously released;

means, responsive to a decision by a second program to migrate another block of said storage to another level, after the storing of said identification but before re-use by said first program, for releasing the first said block from said allocation; and means, responsive to request by said first program for re-use of said first block after the storing of said identification but before release, for deleting said identification for said first block and permitting said first program to access said first block.

\* \* \* \* \*